US009124977B2

(12) United States Patent
Ozcan (10) Patent No.: US 9,124,977 B2
(45) Date of Patent: Sep. 1, 2015

(54) APPARATUS FOR USE IN PORTABLE DEVICES

(75) Inventor: Koray Ozcan, Farnborough (GB)

(73) Assignee: Nokia Technologies Oy, Espoo (FI)

( * ) Notice: Subject to any disclaimer, the term of this patent is extended or adjusted under 35 U.S.C. 154(b) by 158 days.

(21) Appl. No.: 13/518,360

(22) PCT Filed: Dec. 24, 2009

(86) PCT No.: PCT/EP2009/067931
§ 371 (c)(1),
(2), (4) Date: Jun. 21, 2012

(87) PCT Pub. No.: WO2011/076291
PCT Pub. Date: Jun. 30, 2011

(65) Prior Publication Data
US 2012/0257776 A1    Oct. 11, 2012

(51) Int. Cl.
*H04R 1/20* (2006.01)
*H04R 1/28* (2006.01)
*H04M 1/03* (2006.01)
*H04M 1/18* (2006.01)

(52) U.S. Cl.
CPC ............ *H04R 1/2842* (2013.01); *H04R 1/2803* (2013.01); *H04R 1/2819* (2013.01); *H04M 1/035* (2013.01); *H04M 1/18* (2013.01); *H04R 2499/11* (2013.01)

(58) Field of Classification Search
CPC ...... H04R 1/28; H04R 1/2803; H04R 1/2815; H04R 1/2819; H04R 1/2842; H04R 1/2895; H04R 2499/11; H04M 1/035; H04M 1/18
USPC .......... 381/309, 74, 337, 338, 345, 349, 351, 381/353, 354, 370, 375, 384, 322, 324, 330, 381/382, 328; 181/145, 146, 156, 199, 129, 181/160; 379/420.02, 420.03
See application file for complete search history.

(56) References Cited

U.S. PATENT DOCUMENTS

| 3,930,560 | A  | * | 1/1976 | Carlson et al. ................. 181/160 |
| 4,381,830 | A  | * | 5/1983 | Jelonek et al. ................. 181/129 |
| 4,677,679 | A  | * | 6/1987 | Killion ............................ 381/74 |
| 5,092,424 | A  | * | 3/1992 | Schreiber et al. ............. 181/145 |
| 5,887,070 | A  | * | 3/1999 | Iseberg et al. ................. 381/380 |
| 6,504,939 | B1 | * | 1/2003 | Fukuda .......................... 381/386 |
| 6,735,319 | B1 | * | 5/2004 | Vonlanthen ................... 381/330 |
| 7,103,193 | B2 | * | 9/2006 | Croft, III ....................... 381/345 |

(Continued)

FOREIGN PATENT DOCUMENTS

| EP | 1044548 A1 | 10/2000 |
| EP | 1764861 A1 | 3/2007 |

(Continued)

OTHER PUBLICATIONS

International Search Report and Written Opinion received for corresponding International Patent Application No. PCT/EP2009/067931, dated Oct. 18, 2010, 12 pages.

(Continued)

*Primary Examiner* — Huyen D Le
(74) *Attorney, Agent, or Firm* — Harrington & Smith (57) ABSTRACT

An apparatus configured to acoustically process an acoustic signal for a transducer, and to provide a physical interface for a further apparatus within which the apparatus is located.

16 Claims, 5 Drawing Sheets

(56) References Cited

U.S. PATENT DOCUMENTS

| | | | |
|---|---|---|---|
| 7,317,806 B2* | 1/2008 | Harvey et al. | 381/328 |
| 7,409,058 B2 | 8/2008 | Holmes et al. | |
| 7,715,580 B2* | 5/2010 | Nielsen | 381/322 |
| 8,265,324 B2* | 9/2012 | Duarte et al. | 381/374 |
| 8,867,770 B2* | 10/2014 | Chien et al. | 381/332 |
| 2006/0095149 A1 | 5/2006 | Obata et al. | |
| 2006/0120549 A1* | 6/2006 | Burghardt | 381/351 |
| 2007/0053540 A1 | 3/2007 | Harvey | 381/380 |
| 2010/0216526 A1 | 8/2010 | Chen et al. | |

FOREIGN PATENT DOCUMENTS

| | | |
|---|---|---|
| GB | 2337890 A | 12/1999 |
| GB | 2345816 A | 7/2000 |
| GB | 2345816 | 8/2000 |
| JP | 2003-324796 A | 11/2003 |
| KR | 2001-0017270 A | 3/2001 |
| KR | 2002-0087829 A | 11/2002 |
| WO | 00/27096 A1 | 5/2000 |
| WO | 2004/034733 A1 | 4/2004 |
| WO | 2004034733 | 4/2004 |

OTHER PUBLICATIONS

Office Action received for corresponding Chinese Application No. 200980163124.9, dated Dec. 13, 2013, 13 pages.

Office Action received for corresponding European Application No. 09809064.0-1803, dated Dec. 19, 2013, 5 pages.

* cited by examiner

APPARATUS FOR USE IN PORTABLE DEVICES

RELATED APPLICATION

This application was originally filed as PCT Application No. PCT/EP2009/067931 filed Dec. 24, 2009.

The present invention relates to an apparatus. The invention further relates to, but is not limited to, an apparatus for use in portable devices.

Many portable devices, for example mobile telephones, contain a number of acoustic transducers, such as microphones, earpieces and speakers. Such transducers are key components in mobile phone audio/acoustic design. Generally, there will be one or more sound channels or acoustic cavities associated with each acoustic transducer.

Telecommunication devices such as mobile or cellular handsets or other portable devices such as gaming devices or music players are known to include one or more speaker modules together with a suitable sound generating system comprising suitably designed software algorithms, electrical circuitries and mechanical arrangements for at least reproducing a downlink or received audio signal or any other audio signal reproduction. In recent years, the speaker systems have been utilized for audio signals further to assist different use cases comprising music, ringtones, FM radio playback. The performance and quality of the speaker systems are related to various modules comprising the speaker module, mechanical arrangements, signal processing algorithms and/or applications, electrical circuitries. The internal speaker module is integrated within the housing of the devices and the integration techniques may vary. In recent years, the mechanical dimensions of portable devices have been generally reduced in size. This size reduction played an important role for transducer integrations, such as speaker modules, and forced designers to implement techniques that are space efficient. It has become a general rule for speaker modules that a 'conventional design' is commonly applied to devices in recent years. A 'conventional design' comprises known techniques wherein at least one sound outlet is required which is partially or substantially visible to the user. The sound outlet radiates the sound waves to the exterior from the devices. The sound outlet is formed using one or more openings and furthermore configured by the arrangements such as meshes, grill structures. A 'conventional design' may include one or more front cavity and furthermore one or more rear cavity. The rear cavity is usually a sealed cavity but it may also be the internal volume of the device. The front and rear sound cavities are aimed to be acoustically and substantially separated from each other for an optimum and controlled acoustic design. In some designs, it is optional to arrange one or more third cavity where the front and rear sound waves are acoustically coupled. The third cavity is then connected to the sound outlet to radiate sound waves to the exterior.

The location of the sound outlets varies however they are commonly arranged either on the side band or at the back of devices. In some devices, the outlets are possibly located at the front surface of the device. The physical locations of these sound outlets play a very important role for the acoustic design however such arrangement is influenced by other factors such as product shape, industrial and mechanical designs, production and tooling, and the location of other interfaces such as external audio connectors such as a headphone jack, USB connectors, memory card slots, charging connectors. It is understood that these locations for sound outlets are not independently designed and should consider other arrangements.

In an alternative example implementation, a speaker system may comprise a bass reflex element wherein the bass reflex element connects the rear cavity of the speaker module to the exterior of the device. This arrangement may be mechanically more challenging in comparison to a conventional design. In some other examples, the bass reflex port connects the rear cavity to a third cavity wherein the third cavity may also receive the frontal sound waves of the speaker module in a controlled manner. The third cavity is then connected to an outlet wherein the outlet connects the third cavity to the exterior of the device. It is understood that all these or similar arrangements may require challenging mechanical arrangement. The mechanical arrangement for the acoustic design may be compromised further because it is extremely difficult to design optimum system parameters such as the physical dimensions of the bass reflex element. Although it is acoustically a preferred solution, the use of a bass reflex element has been found less favourable because the speaker module may consume more space in the device, and furthermore may require a complex mechanical arrangement together with production and tooling difficulties of parts or apertures. The mechanical arrangements of the entire system should be carefully designed including those components which radiate sound from the sound outlets in order to form a desired frequency response. The mechanical arrangement of similar speaker modules may require a specially designed sound outlet arrangements. In addition, similar arrangements may require a size increase to produce a target frequency response. It is understood that a significant effort and consideration may be required for speaker modules in order to achieve a desired acoustic performance.

In all mechanical arrangements of speaker modules, dust and water protection is extremely important. As a result, a protective mesh or other porous material, where appropriate, is generally designed to assist the audio reproduction quality aspects and maintain good reliability by protecting the speaker modules from particles entering through the sound outlets. However, portable devices have other apertures in the case (such as those provides for audio connectors, chargers connections, and card slots) where dust, other particles and water can enter the internal volume of the device. This dust, other small particles and water could easily reach the speaker modules if the internal acoustic arrangement are not providing substantial seals and may cause component damage. In particular, dynamic moving coil components radiate in each direction as the diaphragm moves forwards and backwards. The construction of the transducer typically has open outlets on each side of the transducer which are free to air. The permanent magnet of the moving coil transducers may attract metallic particles, which easily migrate through the portable device and reach the voice coil and diaphragm. These particles can damage the sensitive components and/or reduce the performance of these components when the apparatus is in operation.

Although further protection may be provided by a protective mesh or other porous material, this use of mesh or suitable protection do not necessarily eliminate or stop dust, water or other metallic particles reaching the speaker modules. In some example designs, it is possible to design a mesh material for the sound outlets and furthermore all internal cavities may be substantially sealed. However, other interfaces or apertures such as those provided for or integrally designed as part of the connectors such as audio connectors, USB connectors, charger connectors, memory card slots may not provide dust, other particles and water protection for the internal volume of the device.

There is provided according to a first aspect of the invention an apparatus configured to acoustically process an acoustic signal for a transducer, and to provide a physical interface for a further apparatus within which the apparatus is located.

The physical interface may be at least one of: a USB connector; an audio connector and/or headphone jack; a memory card slot; a charger connector; and a connector configured to provide a physical interface and an acoustic signal.

The transducer may convert electrical signal to an acoustic signal and may be at least one of a moving coil speaker, an electrostatic (or electret) speaker, a piezo electric speaker, a ceramic speaker and any other suitably designed speaker.

The apparatus may be configured as an acoustic radiator and radiates the acoustic signal from the transducer towards an exterior.

The transducer may convert an acoustic signal to an electrical signal and may be at least one of: an omni-directional microphone, a directional microphone; and any other suitably designed microphone module.

The apparatus may be configured as an acoustic collector or emitter wherein the acoustic signal may be collected towards the transducer.

The apparatus may comprise at least one conduit wherein the acoustic signal may be configured to travel along the conduit.

The conduit may further comprise at least one mesh structure may be further configured to prevent particles from reaching the transducer.

The at least one conduit may be connected to an air volume, and wherein the air volume may be substantially sealed.

The air volume may be acoustically coupled to the transducer.

The at least one conduit may be coupled to the transducer.

The at least one conduit may comprise sound absorbing structures or materials.

The apparatus may further comprise the transducer.

The apparatus may be configured to acoustically tune a frequency response of the transducer.

The frequency response of the apparatus may be configured to take the acoustic effect of the apparatus wherein the acoustic effect may be defined by the parameters of an air conduit of the apparatus.

The physical interface of the apparatus may be configured to transfer an electrical signal to and/or from the further apparatus within which the apparatus may be located.

The apparatus may be supported by the further apparatus comprising a housing configured to contain the apparatus and the transducer, wherein the transducer may be acoustically coupled to an exterior of the housing by the apparatus.

According to a second aspect of the invention there is provided a method comprising: providing an apparatus configured to acoustically process an acoustic signal for a transducer; and providing a physical interface for a further apparatus within which the apparatus is located.

The method providing the apparatus may comprises providing at least one of a USB connector, an audio connector and/or headphone jack, a memory card slot, a charger connector and a connector configured to provide a physical interface and an acoustic signal.

Providing the apparatus configured to acoustically process an acoustic signal for a transducer may comprise configuring the apparatus as an acoustic radiator to radiate the acoustic signal from the transducer towards an exterior.

Providing the apparatus configured to acoustically process an acoustic signal for a transducer may comprise configuring the apparatus as an acoustic collector to collect the acoustic signal towards the transducer.

For better understanding of the present invention, reference will now be made by way of example to the accompanying drawings in which.

Figure 1:
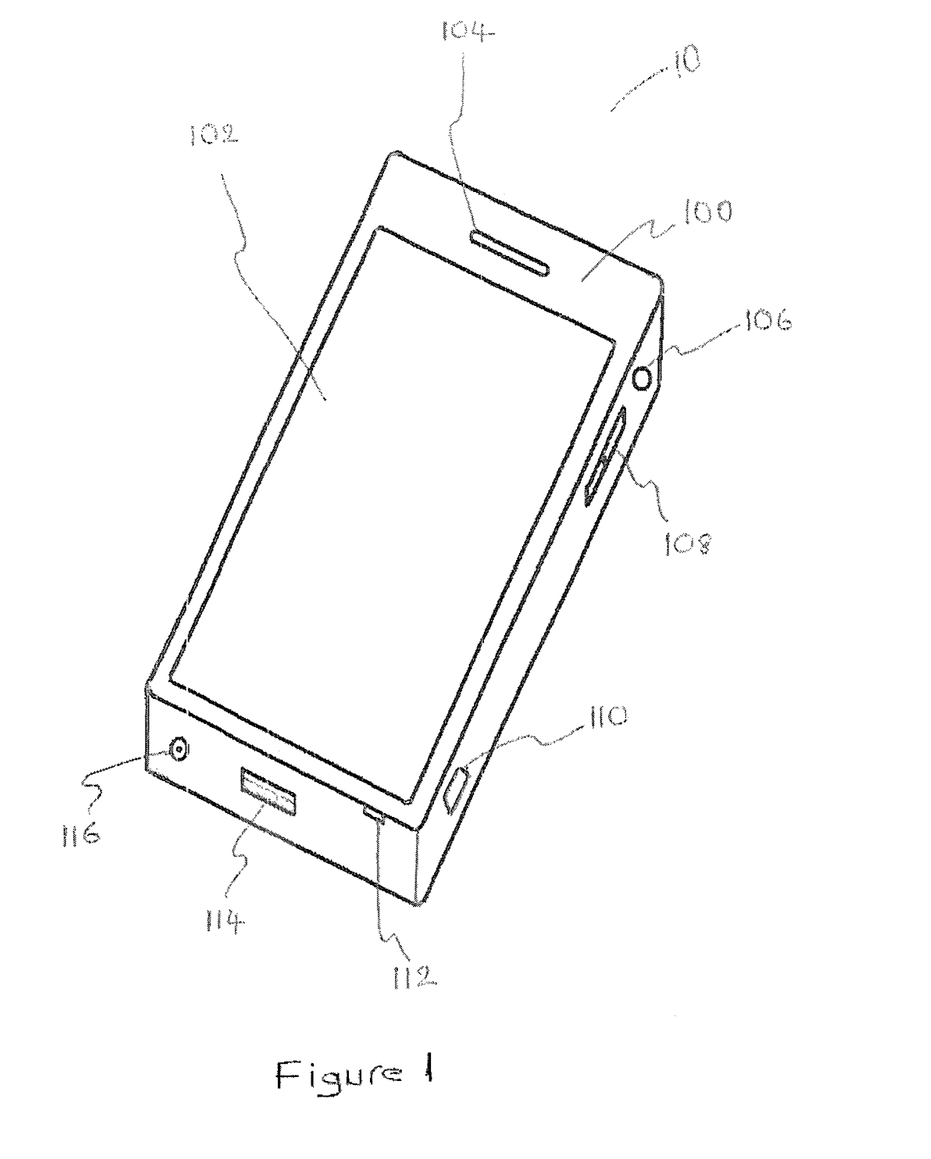
FIG. 1 shows schematically an electronic device apparatus employing embodiments of the invention.
Figure 2:
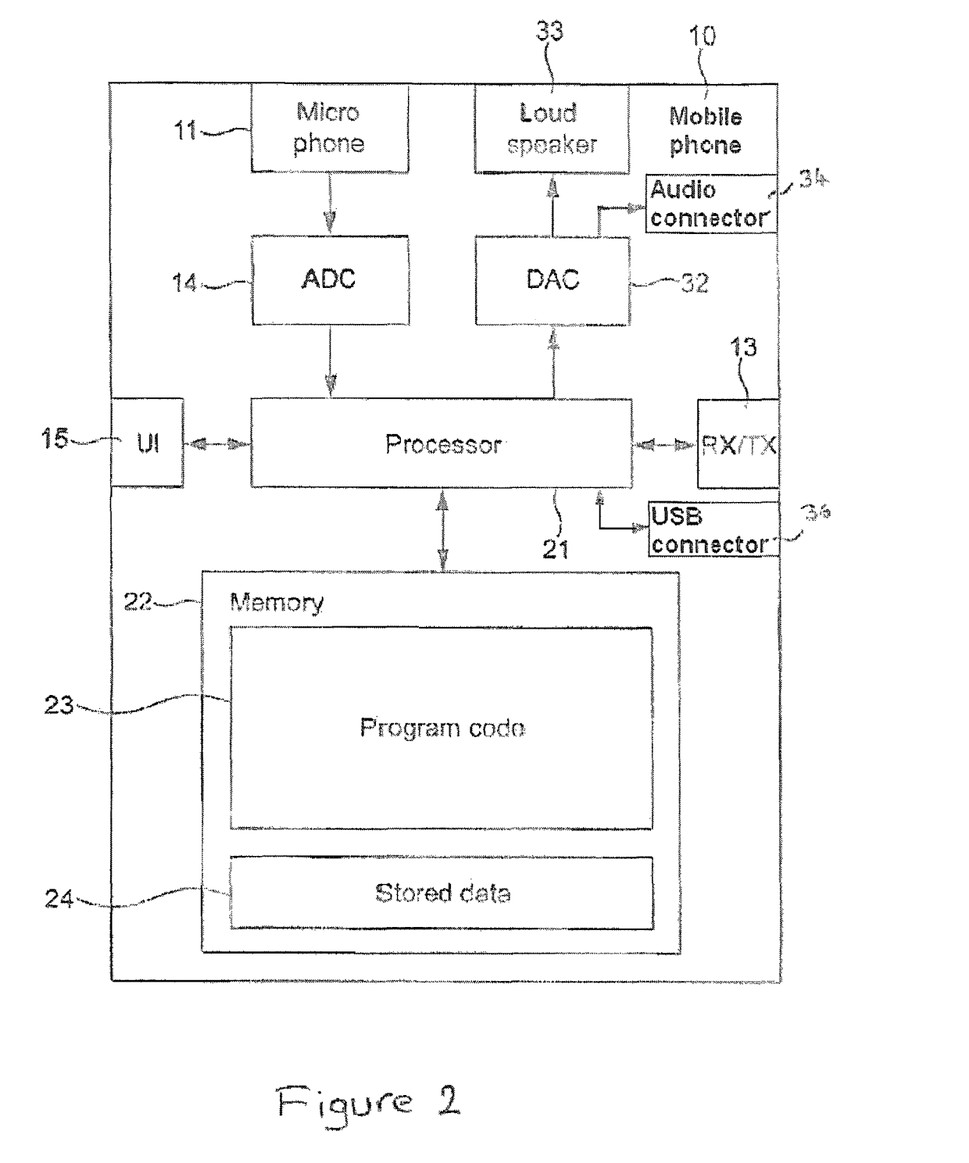
FIG. 2 shows schematically the electronic device shown in FIG. 1 in further detail.
Figure 3:
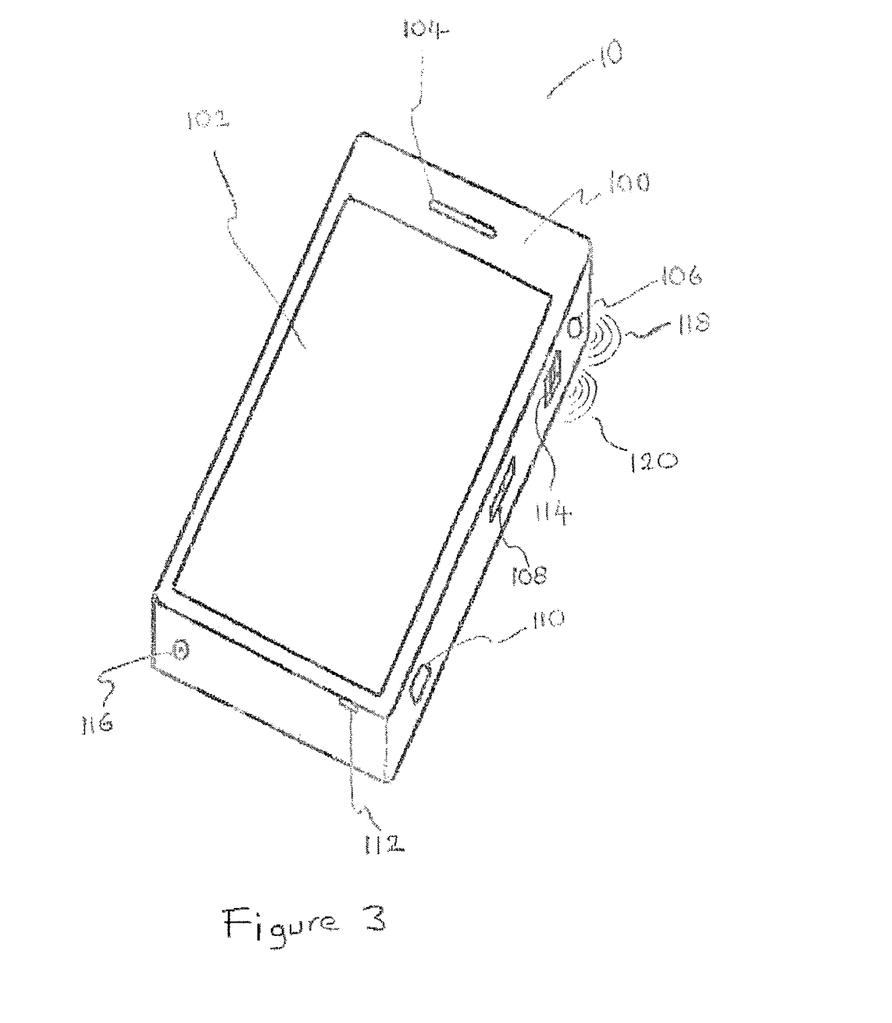
FIG. 3 is a schematic diagram of apparatus shown in FIG. 1 of various embodiments and is useful in understanding the present invention.

The following describes in further detail suitable apparatus and possible mechanisms for the provision of transducer integrations such as those provided for handsfree operations configuring a speaker module or an earpiece module for handset operation or a multi-function device providing both handsfree and handset operations or a microphone module configured by downlink audio or a recording system. In this regard reference is first made to FIG. 1 which shows an illustration of an example system comprising the known solution for a speaker module and other physical apertures such as those used by connectors and provide external interfaces i.e. an audio connector which is designed for a device. The apparatus as shown in FIGS. 1, 2 and 3 are user equipment in the form of a mobile phone. However it would be appreciated at embodiments of the application may be implemented with any devices containing a transducer which may be a speaker module or a microphone and other physical apertures used by connectors may be an audio connector.

FIG. 1 is a plan view of an apparatus suitable for operating as a mobile phone 10 according to some embodiments. In other embodiments the mobile phone 10 may be an electronic device such as a music player or a wireless communication system.

The mobile phone 10 may in some embodiments comprise an outer cover 100 which houses some internal components. The outer cover may comprise a display region 102 through which a display panel is visible to a user. The outer cover in some embodiments comprises a sound aperture 104. In these embodiments the sound aperture 104 may further include a separate bezel for the sound aperture 104 or in some other embodiments may be formed as part of the outer cover 100 or the display region 102. When the sound aperture 104 is placed adjacent to a user's ear, sound generated by an earpiece module (not shown) is audible to the user. The mobile phone 10 may further comprise a volume control button 108 with which the user can control the volume of an output of the speaker modules. The mobile phone 10 comprises at least one sound outlet 114 which may be used to radiate sound waves generated by a speaker module (not shown). The speaker module may be used for handsfree operations such as music playback, ringtones, handsfree speech and/or video call. The sound outlet 114 couples the acoustic output of the speaker module to exterior of the mobile phone 10. In some embodiments, the sound outlet 114 may comprise a suitable mesh structure or grill which may take various forms, shapes or materials and which may be designed in relation to the frequency response of the speaker module 114. The sound outlet 144 may be structured as an array of individual small openings or may be a single cross section area. The sound outlet 114 may be rectangular or cylindrical or may be any other suitable shape. At least one microphone outlet 112 for a microphone module (not shown) may be suitably positioned in mobile phone 10 to capture the acoustic waves by at least one microphone and output the acoustic waves as electrical signals representing audio or speech signals which then may be processed and transmitted to other devices or stored for later playback.

The mobile phone 10 may provide interfaces enabling the user to interface external devices or equipment to the mobile phone 10. For example an audio connector outlet 106 may be suitably positioned in the mobile phone 10. In some embodiments, the audio connector outlet may be substantially hidden behind a suitably arranged door or lid. The audio connector outlet 106 may be suitable for connection with an audio connector (not shown) or may be suitable for connection with an audio or audio/visual (A/V) connector. The audio connector provides releasable connection with audio or A/V plugs (not shown). These plugs provide an end-termination for cabling and are used to connect a peripheral device to the mobile phone 10. In this way, the mobile phone 10 is able to output audio or A/V and receive audio or A/V input. Such audio or A/V plugs are often called round standard connectors and may be in different formats which may comprise at least two contacts. The external device such as a headset may itself comprise a microphone or suitable connection for a microphone or further connection suitable for end terminating further cabling. The audio connector and/or associated plug may be a standardized 2.5 mm or 3.5 mm audio connector and plug. It is accordingly understood the audio connector outlet 106 may be formed comprising a suitably arranged cross section area.

The mobile phone 10 may further comprise in some embodiments a universal serial bus (USB) interface outlet 110. The USB interface outlet 110 is suitably arranged for a USB connector (not shown). The mobile phone 10 may further require a charging operation and therefore comprise a charging connector 116. The charging connector 116 may be of various sizes, shapes and combinations or in some embodiments can be visually or substantially hidden.

In FIG. 2, a schematic block diagram of an exemplary mobile phone 10 or apparatus is explained in further detail.

The mobile phone 10 comprises a processor 21 which may be linked via a digital-to-analogue converter (DAC) 32 to a speaker module wherein the speaker module is a loudspeaker 33. The loudspeaker in some embodiments may be connected to an external electronic device via an audio connector 34. In some embodiments the loudspeaker 33 may be used as an earpiece module suitable for handset speech call. The mobile phone 10 further comprises at least one microphone 11 and an analogue-to-digital converter (ADC) 14 configured to convert the input analogue audio signals from the at least one microphone 11 into digital audio signals and provide the digital audio signals to the processor 21.

In some embodiments, the mobile phone 11 may comprise an array of microphones. At least one of the microphones 11 may be implemented by an omnidirectional microphone in some embodiments. In other words these microphones may respond equally to sound signals from all directions. In some other embodiments at least one microphone comprises a directional microphone configured to respond to sound signals in predefined directions. In some embodiment at least one microphone comprises a digital microphone, in other words a regular microphone with an integrated amplifier and sigma delta type ND converter in one component block. The digital microphone input may in some embodiments be also utilized for other ADC channels such as transducer processing feedback signal or for other enhancements such as beamforming or noise suppression.

The mobile phone 10 may comprise multiple transducer modules that may serve different use cases. The audio connector 34 provides a physical interface to an external module such as a headphone or headset or any suitable audio transducer equipment suitable to output from the DAC 32. In some embodiments the loudspeaker and the audio connector are available in the mobile phone 10. Furthermore in some embodiments the external modules may connect to the mobile phone 10 wirelessly via a transmitter or transceiver, for example by using a low power radio frequency connection such as Bluetooth A2DP profile. The processor 21 is further linked to a transceiver (TX/RX) 13, to a user interface (UI) 15 and to a memory 22.

It is shown the mobile phone 10 comprises a USB connector 36. The USB connector 36 may be a standard USB or may be a micro or mini USB. The USB standard provides specifications for a host, a device and the cabling which links them. Amongst other requirements of the standard, a USB host may be capable of detecting the speed of those devices with which it is communicating. In some embodiments, the USB connector provides releasable connection with audio or A/V USB plugs (not shown). The mobile phone 10 may therefore comprise a suitably integrated USB control function which may be controlled by the processor.

The processor 21 may be configured to execute various program codes. The implemented program codes may in some embodiments comprise individual settings for generating suitable audio signals to the loudspeaker 33 and/or the audio connector 34. The implemented program codes 23 may be stored for example in the memory 22 for retrieval by the processor 21 whenever needed. In some embodiments, the codes are adaptively generated suitable for dedicated use cases. The memory 22 could further provide a section 24 for storing data, for example data that has been processed in accordance with the embodiments.

The user interface 15 enables a user to input commands to the mobile phone 10, for example via a keypad and/or a touch interface. Furthermore the mobile phone or apparatus 10 may comprise a display. The processor in some embodiments may generate image data to inform the user of the mode of operation and/or display a series of options from which the user may select using the user interface 15. For example the user may select or scale a gain effect or an equalizer setting for audio signals to set a custom playback characteristic which may be modified depending on which speaker module or external module is used. In some embodiments the user interface 15 in the form of a touch interface may be implemented as part of the display in the form of a touch screen user interface.

The transceiver 13 in some embodiments enables communication with other electronic devices, for example via cellular or mobile phone gateway servers such as Node B or base transceiver stations (BTS) and a wireless communication network, or short range wireless communications to the microphone or external modules where they are located remotely from the apparatus.

It is to be understood again that the structure of mobile phone 10 could be supplemented and varied in many ways.

An example embodiment of the invention is presented in FIG. 3 wherein the mobile phone 10 is configured to produce an acoustic output of the loudspeaker 33 (not shown) using the sound outlet 114 and the audio connector outlet 106. In an example embodiment, the frequency response of the loudspeaker 33 may be a joint function of transfer functions configured by a first acoustic output 120 and a second acoustic output 118. The second acoustic output 118 is provided using the audio connector outlet 106 wherein the audio connector outlet 106 is substantially or integrally designed for the audio connector 34 that has an air conduit that may receive external plugs for interfaces such as headsets or audio/AV plugs. The sound outlet 114 radiates the first acoustic output 120 which may be generated from a first direction of the loudspeaker 33. At the same time, the audio connector outlet 106 may radiate the second acoustic output 118 from a second direction of the loudspeaker 33. The loudspeaker 33 may take any suitable form, for instance it may include an electromagnetic coil and diaphragm arrangement, or an electrostatic speaker transducer, or a piezo electric transducer, or any other suitable transducer. The loudspeaker 33 comprises a component (not shown) with a surface, the component being movable in a direction generally perpendicular to the surface such that the loudspeaker 33 causes pressurisation or movement of air towards each direction. In the case of the loudspeaker 33 being a moving coil transducer or an electrostatic (or electret) transducer, the component is a diaphragm. For a piezo transducer, the component may be a surface of a piezo element.

It is realized that the frequency response of the loudspeaker 33 is substantially improved when the audio connector 106 is employed for the purpose of sound radiation towards the exterior of the mobile phone 10. In some example embodiments, the audio connector 34 may be used as a bass reflex element wherein the low frequency performance of the loudspeaker 33 may be improved. The bass reflex element comprises a channel between the rear arrangement of loudspeaker 33 and the exterior of the mobile phone 10. It is understood that the rear arrangement of the loudspeaker 33 may be acoustically connected to the exterior of the mobile phone 10 using the audio connector outlet 106. It is understood that the rear arrangement of the loudspeaker 33 is acoustically and substantially connected to the exterior using the audio connector 34. The audio connector 34 also serves a physical interface between the mobile phone 10 and various external equipments. The front arrangement of the loudspeaker 33 may be acoustically connected to the exterior of the mobile phone 10 using the sound outlet 114. In some example embodiments, the front and rear arrangement of the loudspeaker 33 may be mixed in a substantially sealed cavity wherein the sound waves are connected to the exterior of the mobile phone 10 using at least one of the sound outlet 114 and the audio connector outlet 106. In some example embodiments, it may be that only the audio connector outlet 106 may be used as a sound outlet.

Figure 4:
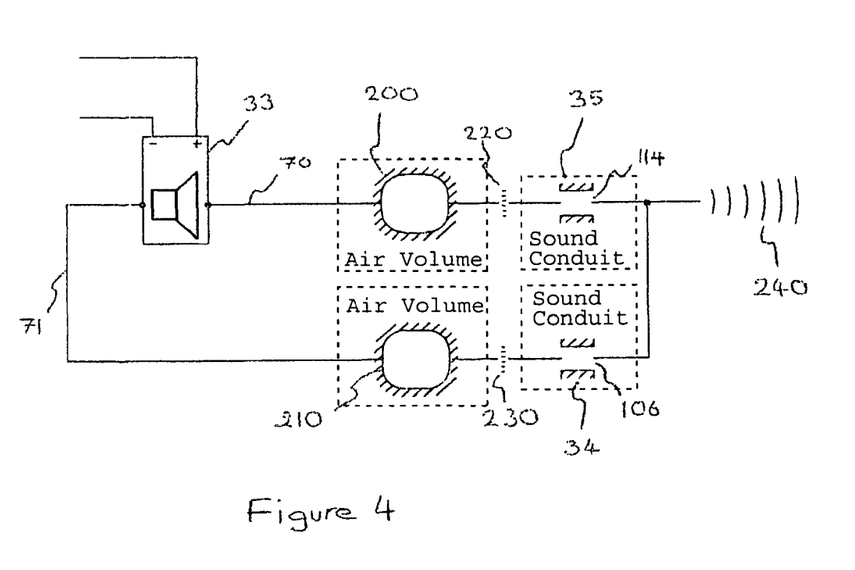
FIG. 4 is a schematic diagram of an electro acoustic model illustrating elements for forming a sound generating system according to an embodiment of the invention.

FIG. 4 shows an example model illustrating elements for forming a sound generating system implemented for the mobile phone 10 according to an example embodiment as shown in FIG. 3. The illustrated model comprises a first cavity 200, the loudspeaker 33 and a second cavity 210. The loudspeaker 33 generates sound waves which travel towards the first cavity 200 and the second cavity 210. The sound waves radiate towards the exterior of the mobile phone 10 via the sound outlet 114 and the audio connector outlet 106. It is understood that the radiation characteristic 240 of the loudspeaker 33 is a joint function of transfer functions configured by the first acoustic output 120 and the second acoustic output 118. The acoustic coupling of the depicted elements is illustrated by acoustic coupling paths, for example the acoustic coupling path 70 coupling acoustically the sound waves generated towards front of the loudspeaker 33 to the first cavity 200. In a similar manner, the acoustic coupling path 71 is shown coupling the sound waves generated towards rear of the loudspeaker 33 to the second cavity 210. An acoustic coupling may be understood as a coupling and decoupling of energy, herein acoustic energy, respectively. It is known that the acoustic coupling is achieved by appropriate mechanical arrangements inside mobile phone 10.

In general, transducers have a radiation direction for example a dedicated direction in which sound waves are mainly emitted and in which the emitted sound waves have the highest average sound pressure level. In this regard, the surface of the loudspeaker 33 from which the main radiation direction of the loudspeaker extends is understood as the front surface of the loudspeaker according to example embodiment of FIG. 4. The opposite direction to the main radiation direction is understood to be the rear surface of the loudspeaker. In some example embodiments, the cavity configurations and associated outlet arrangements may be different. For example, it may be that the first cavity 200 may receive sound waves from the rear surface of the loudspeaker 33 and at the same time the second cavity 210 may receive sound waves from the front surface of loudspeaker 33. In some example embodiments, the first and second cavities are substantially sealed and acoustically may not directly influence each other.

The first cavity 200 and/or the second cavity 210 serve as acoustic resonators having different resonance characteristics for amplifying the sound pressure level in certain different frequency sections when the cavities are coupled with the outlets for example the sound outlet 114 and the audio connector outlet 106. Resonance amplifying may be employed in frequency regions in which loudspeaker 33 is inefficient i.e. generate low frequency signals with low sound pressure level, or when it is desired to rise the sound pressure level in one or more frequency regions. The second cavity 210 serves as an acoustic resonator for amplifying low acoustic frequencies in conjunction with the audio connector 34. The audio connector 34 may act as a bass reflex element wherein the low frequency performance of the loudspeaker 33 may be further improved. The acoustic properties of the cooperating second cavity 210 and the audio connector 34 resulting in the acoustic behaviour of this arrangement are determined among other things by physical volume/dimensions of the second cavity 210 and a design or construction of the audio connector 34. In addition, the loudspeaker 33 according to an embodiment of the invention radiates towards both the first cavity 200 and the second cavity 210, wherein the second cavity 210 is designed in such a way that acoustic leakage between the second cavity 210 into the first cavity 200 is prevented which may otherwise result in a low emitting efficiency. In some embodiments, the each individual acoustic cavity may have a low level of leakage. The level, or amount, of leakage allows pressure equalization across the loudspeaker 33. The leakage may be provided by a small aperture in the housing of the loudspeaker 33. Alternatively, the leakage may result from an intentionally imperfectly sealed joint between two parts of the housing wherein loudspeaker 33 is positioned, or between the housing and the loudspeaker 33.

The design of the second cavity 210 is constructed to enhance the low frequency efficiency and to form a resonator allowing for resonance amplifying with a corresponding suitable frequency range. These conditions can be attained by designing the second cavity 210 having a significantly larger volume than the volume of the first cavity 200. Further, the volume of the first and second cavity can be designed in such a way that some additional structures may be employed for example a packaging technique may allow activated carbon to be suitably positioned inside the acoustic cavities (not shown) to therefore minimize the required air volume size. It may be that other absorbent filling materials may be used as well as or instead of the activated carbon described above in other embodiments. The form of the activated carbon is not limited and may be granular, fibrous or powdered or any other mix of forms. In addition, an array of narrow ducts (e.g. parallel ducts, or parallel round cylinders of a small diameter or any other suitably designed structures) made of a pre-selected material with predetermined dimensions (e.g. the diameter and length) formed within said acoustic cavities may be positioned to substantially absorb the sound waves radiated from the loudspeaker 33. The absorbing members and/or materials may have any shape. The absorbing material may comprise a plurality of carbon nanotubes. The plurality of nanotubes and/or other narrow ducts may be arranged suitably.

In some embodiments, the loudspeaker 33 may be designed in such a way that an absorbing members and/or materials are located in a suitably formed cavity inside of the loudspeaker 33. The plurality of absorbing members or other materials such as activated carbon constitutes a pressure compensation apparatus may include absorbing members which may be in different sizes and different shapes. It is understood that this example construction may reduce the size of acoustic cavities or other mechanical arrangements inside of the mobile phone 10 when the loudspeaker 33 is suitably designed. Further, the loudspeaker 33 may be designed in such a way that the loudspeaker may comprise the audio connector 34. In this example embodiment, it is understood that the loudspeaker 33 and the audio connector 34 are designed as a single module that may also comprise the sound absorbing arrangements.

In some example embodiments, the sound waves from the first and second acoustic cavities are radiated towards exterior however in some other example embodiments a protective mesh or other porous material, where appropriate, may be designed to improve reproduction quality aspects for example to provide an appropriate acoustic damping and to maintain a good reliability by protecting the speaker modules from particles entering through the sound outlets.

In the example embodiment shown in FIG. 4, a filter or mesh structure 220, 230 are provided behind the sound outlet 114 and the audio connector outlet 106. The mesh structures 220, 230 are configured to protect the loudspeaker 33 against dust, water and other type of environmental conditions entering through the sound outlet 114 and the audio connector outlet 106. The product reliability is therefore improved over apparatus without such mesh structure 220, 230. The acoustic properties of the mesh structure 220, 230 may in some embodiments be chosen in relation to the frequency response of the loudspeaker 33. The location and characteristics of the mesh structure 220, 230 such as acoustic transparency, density, and softness may be suitably defined. In some embodiments, the mesh structure 220 may be designed in front of the sound outlet 114 and the mesh structure 230 may be designed behind and/or along and/or around the audio connector 34 suitably. In other example embodiments, the sound outlet 114 and the audio connector outlet 106 may be substantially or partially constructed in consideration with a suitable grill or mesh structure which may take various forms, shapes or materials. As the dimension of the sound outlet 114 and the audio connector outlet 106 has an impact on the acoustical behaviour of the overall mobile phone 10 and the arrangement of the several acoustic components, respectively, it may be preferred to place the mesh structures close to the outlets or may be spaced with a predefined distance from the sound outlet 114 and the audio connector outlet 106.

In some example embodiments, the second acoustic cavity may not be necessarily used wherein the rear sound waves are directly coupled against the audio connector 34. According to some aspects of the invention, this system may be used with or without the sound outlet 106.

In an example embodiment in FIG. 4, the first cavity 200 serves as an acoustic resonator for amplifying mid and/or high frequency regions, particularly above the low frequency region relating to the second cavity 210. The first cavity 200 serves as an acoustic resonator for acoustic amplifying in conjunction with the sound outlet module 35 wherein the sound outlet module 35 may be formed by the material thickness of the outer cover 100 of the mobile phone 10 and may be extended by means of other constructions such as gaskets or increased thickness of moulded parts. The cross section area of the sound outlet module 35 in some embodiments forms the sound outlet 114. The acoustic properties of both the first cavity 200 and the sound outlet module 35 contribute to the resulting resonance amplification. The acoustic properties of the cooperating first cavity 200 and the sound outlet module 35 resulting in the acoustic behaviour of this arrangement are determined among other things by physical volume/dimensions of the first cavity 200 and a design or construction of the sound outlet module 35. According to an example embodiment in FIG. 4, the resonance amplification is a cooperative effect depending on the acoustic properties of both the first cavity 200 and the sound outlet module 35 and their interaction to the description in context with the second cavity 210 and the audio connector 34. According to some embodiments of the invention, it may be that the audio connector 34 may be used in conjunction with the first cavity 200 to form a desired resonance frequency. In some alternative embodiments, the audio connector 34 may be used without the first cavity 200. It is understood that the front surface of the loudspeaker 33 may be acoustically coupled with the audio connector 34.

Figure 5:
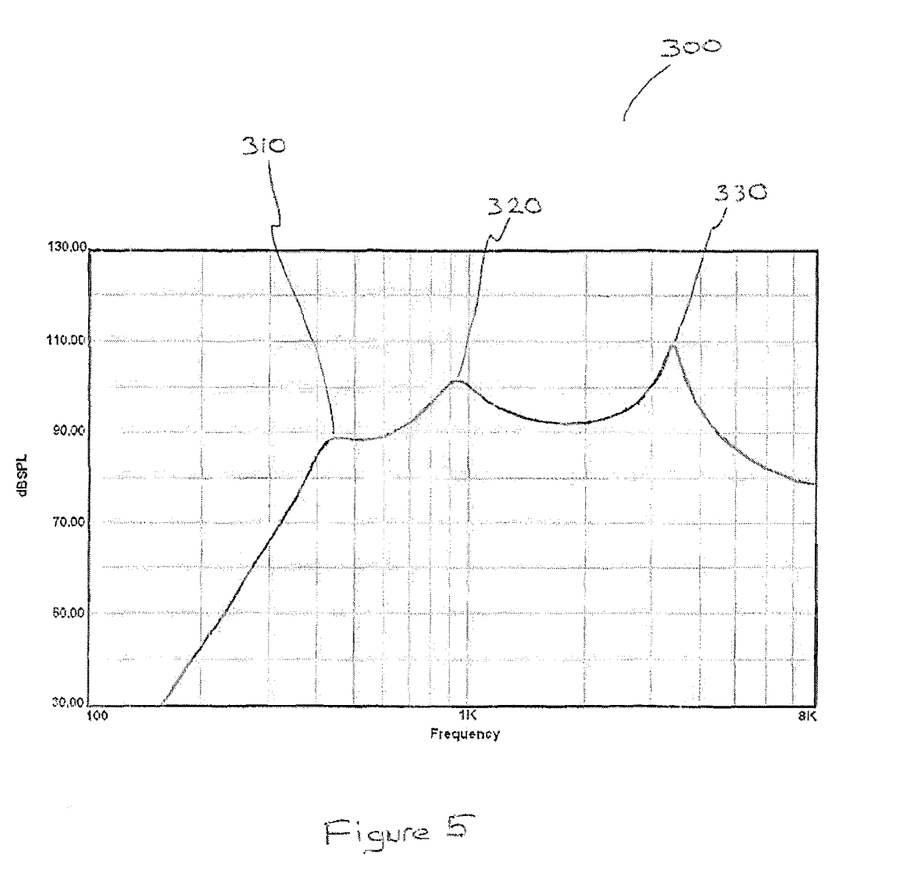
FIG. 5 shows a frequency response curve plot being based on embodiment presented in FIG. 4 according to the invention.

FIG. 5 shows a frequency response plot of an example embodiment presented in FIG. 4. It is shown that the frequency response curve 300 has a logarithmic frequency abscissa and a linear acoustic signal power ordinate. A number of three peak frequency points out of the total depicted frequency range 100 Hz to 8 kHz are emphasized. The curve plot comprises these three peak frequencies associated with one or more certain components of the example presented in FIG. 4.

The first peak 310 of the frequency response curve 300 shown in FIG. 5 occurs between 400 Hz and 500 Hz, and is caused by the acoustic properties of the second cavity 210 in conjunction with the audio connector 34. The acoustic properties of the second cavity 210 being primarily defined by its volume in conjunction with the audio connector 34 embodied as a vent having a certain predefined cross sectional area and a predefined certain length depending on the volume (or vice versa respectively). The first peak 310 in the range of approximately between 400 Hz and 500 Hz may be seen as a low frequency amplification of acoustic signals. Low frequency acoustic signals are excited in both the second cavity 210 and the first cavity 200, whereas the second cavity 210 in conjunction with the audio connector 34 is designed to act as a low frequency acoustic amplifier. In other words the low frequency components may be altered by both cavities, however the second cavity when combined with a tube may in some embodiments forms another resonance and this further resonance is not formed by the first cavity.

The second peak 320 of the frequency response from the example shown in FIG. 4 as shown in the frequency response curve 300 of FIG. 5 is in the region of 900 Hz resulting from the acoustic properties of the loudspeaker 33. The second peak 320 represents the main acoustic resonance peak of the loudspeaker 33. The skilled person would understand that alternative transducer modules may comprise a different resonance frequency in a substantially sealed acoustic cavity. The third peak 330 of the frequency response is around 3.5 kHz resulting from the acoustic properties of the first cavity 200 in conjunction with the acoustic properties of the sound outlet module 35. According to other embodiments of the invention, the position, characteristics and the number of peaks may vary or be varied. It is understood that the example frequency response curve 300 is an example frequency response wherein the frequency response curve 300 comprises the acoustic effect of the at least one connector and is the audio connector 34.

According to some example embodiments of the present invention, the configuration of audio connector 34 for acoustic sound reproduction within the mobile phone 10 is an example system only and that as described above in some embodiments the acoustic arrangement of speaker modules may form various other frequency responses not explicitly mentioned above and other frequency responses having alternative characteristics are not excluded by the invention. It will be understood that any other connector may be used in such a way similar to the audio connector 34 may be configured to form a desired frequency response and other combinations directly or indirectly may employ air conduits of multiple connectors configuring a sound reproduction system are not excluded by the invention. The shape, material and location of the audio connector 34 or any other connector, either standard or customized connectors, may be selected based on the requirements for the mobile phone 10. It is understood that air conduits of connectors are employed for the purpose of sound reproduction or even sound capturing.

The embodiments described with reference to FIGS. 1 to 5 are particularly referred to speaker modules employed for sound reproduction for handsfree operations, however, according to alternative embodiments, additional sound outlet/s may be configured by means of employing air conduits of connectors either alone or with at least one of other traditional outlets may provide sound reproduction on the outer cover 100 near to the sound aperture 104 for the earpiece speaker module. It is understood that such example design may be used for handset operation. This may also result in a leak tolerant acoustic system. A suitably designed leak tolerant system may improve the sound quality of the earpiece speaker modules because its low frequency performance may still be good without sealing the earpiece area against the user's ear and the frequency response becomes more independent of how the earpiece area is positioned against the ear. In alternative embodiments, a single speaker module may be configured in such a way that the handset and handsfree operations may be benefited by configuring air conduits of at least one connector. In other alternative embodiments, there may be at least two speaker modules operate as a stereo playback. In these example embodiments, one speaker module could be used in conjunction with one connector and the second speaker could be used in conjunction with an alternative connector. For example, the USB interface outlet 110 could be utilized by a first speaker and the audio connector outlet 106 could be utilized by a second speaker wherein the first and second speaker designs may be configured to be able to produce a substantially similar acoustic frequency response however other combinations are not excluded by the invention.

Although in the above embodiments the fluid present within the configurations shown in the above figures is air, it would be appreciated that other fluids may be used to conduct the acoustic waves role in the acoustic system.

Furthermore it should be realised that the foregoing embodiments should not be construed as limiting. Other variations and modifications will be apparent to person skilled in the art upon reading the present application. The disclosure of the present application should be understood to include any novel features or any novel combination of features either explicitly or implicitly disclosed herein or any generalisation thereof and during the prosecution of the present application or of any application derived there from, new claims may be formulated to cover any such features and/or combination of such features.

Although it is not explicitly shown in FIGS. 1 to 5, the mobile phone 10 may comprise analogue and digital components configured to drive the loudspeaker 33. The mobile phone 10 thus in these embodiments may further comprise a digital signal processing (DSP) component. The mobile phone 10 in same or other embodiments may comprise a microprocessor or processor configured to control and carry out the operations of the mobile phone 10. In some embodiments the mobile phone may comprise a battery configured to power the electrical components of the mobile phone 10, such as for example the DSP component and processor. In some embodiments the analogue and digital components configured to drive the loudspeaker 33 may be in communication with the DSP component and with the microprocessor. In such embodiments the DSP and/or the microprocessor may control the analogue and digital components configured to drive the loudspeaker 33 to provide driving signals to the loudspeaker 33. In other embodiments the DSP component and/or the microprocessor may adjust signals fed to the loudspeaker 33, for example by providing an at least one of: an equalizer function, a gain control, a dynamic range controller, an excessive diaphragm movement prevention control. The operation of the DSP module and/or the microprocessor may in some embodiments improve performance of audio playback. Other alternative configurations are conceivable and are within the scope of this disclosure. According to example embodiments of the invention, the mobile phone 10 comprises analogue and digital components configured to process microphone signal captured by the microphone 11.

The embodiments described with reference to FIGS. 1 to 5 comprise the loudspeaker 33, the audio connector 34 and a substrate (not shown) configured to provide an electrical interface to the loudspeaker 33 and the audio connector 34. In some of the embodiments, the electrical interface may be achieved via a flexible connection which is interfaced with the substrate. In some of the above embodiments the substrate is furthermore configured to form a partially or substantially sealed rear cavity defined by one surface of the transducer and/or one of the connector such as the audio connector 34 and one surface of the substrate. However, according to some other embodiments, the substrate may provide an electrical interface only for the loudspeaker 33 and the audio connector 34. In these embodiments, the loudspeaker 33 and/or the audio connector 34 may be surrounded by a suitably designed housing structure. The acoustic cavities such as the second cavity 210 may in these embodiments be defined by the housing structure and the loudspeaker 33 and/or the audio connector 34. The housing structure may in these embodiments further comprise a small conduit (not shown) to provide a pressure equalization. The housing structure may further comprise a mesh structure or a filter for the small conduit configured to prevent particles from passing through the conduit. It is understood that in such embodiments at least a substantial protection for the loudspeaker 33 and/or for the audio connector 34 may against dust and other small particles may be achieved.

Thus, a mobile phone 10 in some embodiments may comprise one or more of the transducers and one or more connectors as described above.

Thus in at least one embodiments there may be apparatus comprising: a transducer comprising an air displacement component that is configured to move upon application of an electrical signal; at least one substantially sealed cavity comprising an acoustic volume; and at least one air conduit to interface with at least one connector, wherein the at least one connector comprises an air conduit and is configured to provide other interfaces to the apparatus and therefore the air conduit of the connector acoustically radiates the sound waves of the transducer to the exterior of the apparatus.

It shall be appreciated that the term mobile phone or user equipment is intended to cover any suitable type of equipment with an earpiece or speaker configuration, such as mp3 players, radio receivers and transceivers, and portable data processing devices or portable web browsers with audio capabilities. Furthermore, it will be understood that the term acoustic sound channels is intended to cover sound outlets, channels and cavities, and that such sound channels may be formed integrally with the transducer and/or with the connectors, or as part of the mechanical integration of the transducer and/or the connector with the device.

As used in this application, the term 'circuitry' refers to all of the following:
(a) hardware-only circuit implementations (such as implementations in only analogue and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising
an audio transducer; and
a connector physical interface for receiving an external component, the connector physical interface being configured to transfer an electrical signal so as to provide an electrical interface between the apparatus and the external component and to radiate an acoustic signal;
wherein the connector physical interface comprises at least one air conduit integrally formed with the connector physical interface to radiate the acoustic signal such that the audio transducer is acoustically connected to an exterior of the apparatus at least using the at least one air conduit so as to radiate the acoustic signal from the audio transducer towards the exterior of the apparatus.

2. The apparatus as claimed in claim 1, wherein the connector physical interface is at least one of:
a USB connector;
an audio connector and/or headphone jack;
a memory card slot;
a charger connector; and
an electrical connector configured to provide a physical connector interface and an acoustic signal.

3. The apparatus as claimed in claim 1, wherein the audio transducer converts electrical signal to an acoustic signal and is at least one of:
a moving coil speaker;
an electrostatic (or electret) speaker;
a piezo electric speaker;
a ceramic speaker; and
any other suitably designed speaker.

4. The apparatus as claimed in claim 1, wherein the at least one air conduit is configured to radiate the acoustic signal such that the acoustic signal travels along the at least one air conduit.

5. The apparatus as claimed in claim 4, wherein the at least one air conduit is connected to an air volume, and wherein the air volume is a substantially sealed acoustic cavity.

6. The apparatus as claimed in claim 5, wherein the air volume is acoustically coupled to the audio transducer.

7. The apparatus as claimed in claim 4, wherein the at least one air conduit comprises at least one of;
at least one sound absorbing structures or materials;
at least one mesh structure.

8. The apparatus as claimed in claim 4, the at least one air conduit is coupled to the audio transducer.

9. A module comprising the apparatus according to claim 1.

10. The apparatus as claimed in claim 1, wherein the apparatus is configured to acoustically tune a frequency response of the audio transducer.

11. The apparatus as claimed in claim 10, wherein the frequency response of the apparatus is configured to take the acoustic effect of the apparatus, the acoustic effect being defined by parameters of the at least one air conduit of the apparatus.

12. The apparatus as claimed in claim 1, wherein the physical connector interface of the apparatus is configured to transfer the electrical signal to and/or from a further apparatus within which the apparatus is located.

13. The apparatus according to claim 1, wherein the audio transducer is configured to radiate the acoustic signal; and the physical connector interface is configured as a bass reflex element.

14. A method comprising:
providing an apparatus configured to acoustically process an acoustic signal for an audio transducer;
providing a connector physical interface for receiving an external component, the connector physical interface being configured to transfer an electrical signal so as to provide an electrical interface between the apparatus and the external component and to radiate the acoustic signal;
providing at least one air conduit integrally formed with the connector physical interface to radiate the acoustic signal and coupling the audio transducer acoustically to an exterior of the apparatus at least using the at least one air conduit so as to radiate the acoustic signal from the audio transducer towards the exterior of the apparatus.

15. The method as claimed in claim 14, wherein providing the apparatus configured to acoustically process the acoustic signal for the audio transducer comprises configuring the apparatus as an acoustic radiator to radiate the acoustic signal from the transducer towards the exterior of the apparatus.

16. The method according to claim 14, wherein the audio transducer is configured to radiate the acoustic signal towards a rear of the apparatus; and the physical connector interface is configured as a bass reflex element.

* * * * *